July 10, 1923.
C. E. ROGERS
1,461,164
METHOD OF CONDENSING FLUIDS
Filed Feb. 7, 1919
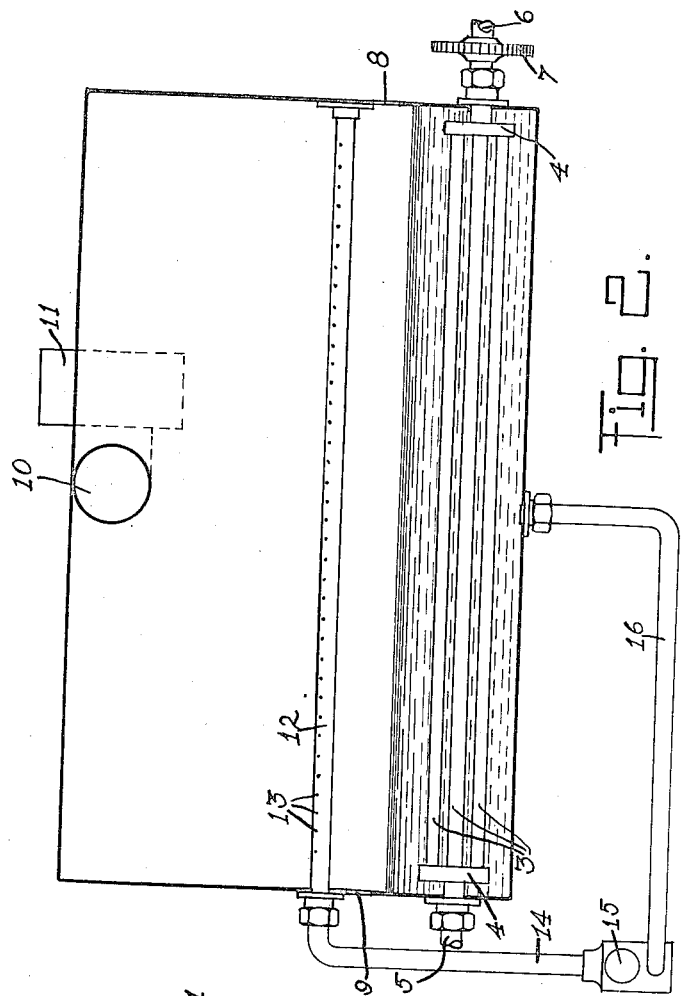
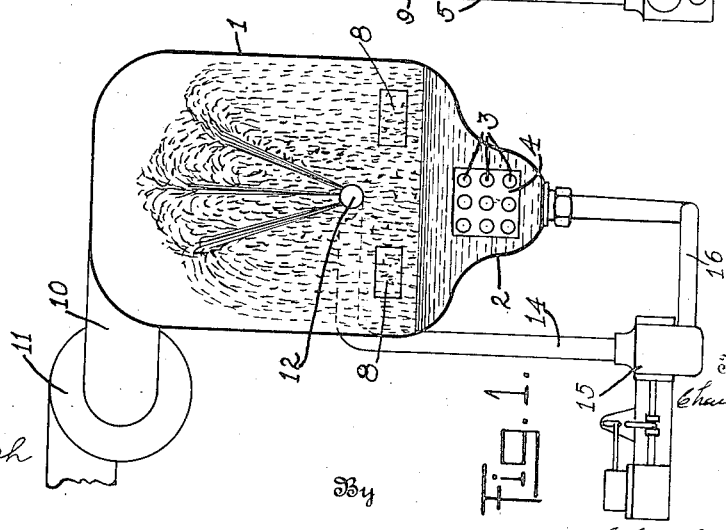

Patented July 10, 1923.

1,461,164

UNITED STATES PATENT OFFICE.

CHARLES E. ROGERS, OF DETROIT, MICHIGAN.

METHOD OF CONDENSING FLUIDS.

Application filed February 7, 1919. Serial No. 275,498.

*To all whom it may concern:*

Be it known that I, CHARLES E. ROGERS, a citizen of the United States, residing at Detroit, county of Wayne, State of Michigan, have invented a certain new and useful Improvement in Methods of Condensing Fluids, and declare the following to be a full, clear, and exact description of the same, such as will enable others skilled in the art to which it pertains to make and use the same, reference being had to the accompanying drawings, which form a part of this specification.

This invention relates to a method of condensing milk and other fluids containing solids, and its object is to provide a method of condensing fluids, particularly milk in a more rapid and economical manner than with present methods and without detrimental chemical or physical change. A further object of the invention is to provide a method whereby the maximum quantity of fluid may be condensed at a minimum expense and dispensing with the usual vacuum pans or hot air currents ordinarily utilized for this purpose. A further object is to provide a method whereby a maximum surface of heated fluid may be exposed to current of air at normal atmospheric temperature to absorb the moisture therefrom. These and other objects of the invention are hereinafter more fully described and claimed and an apparatus diagrammatically shown whereby the method may be performed and in which—

Fig. 1 is a diagrammatic view in cross section of an apparatus by means of which my improved method may be performed.

Fig. 2 is a vertical longitudinal section of the apparatus.

As above stated, the drawings are diagrammatic in form merely showing the general arrangement of the several parts whereby the method may be performed. The receptacle 1 may be of various sizes depending upon the quantity of fluid to be condensed and the bottom of the receptacle is provided with a longitudinal channel 2 into which the fluid naturally tends to flow. In this channel is provided a series of steam tubes 3 connected at each end with a header 4 and provided with an inlet 5 and an outlet 6, the inlet being connected with a steam line and the headers being arranged to pass steam through all of the tubes. This series of steam tubes is to be rotated in any approved manner as by means of a sprocket wheel 7 attached to a projecting portion of either the inlet or to the outlet as shown. By rotation of this group of tubes the fluid is continuously agitated and all parts thereof practically equally heated and, if milk is to be condensed, the fluid should be heated to about 140 degrees F. and should not be heated materially above 160 degrees F. If heated materially in excess of 160° F. a cooked taste is imparted to the milk which is undesired.

In comparison to the total height of the receptacle 1, the fluid level is quite low, the depth of the liquid being about one-fourth the height of the receptacle and means (not here shown) should be provided for discharging the fluid into the receptacle and the level thereof may be automatically maintained at a predetermined point by well known means if so desired. Slightly above the normal level of fluid therein, the receptacle is provided with apertures 8 and 9 at opposite ends thereof as shown in the drawing and, at the upper end centrally of the receptacle is provided an outlet conduit 10 connected with which is an exhaust fan 11. Operation of the fan draws air through the apertures 8 and 9 into the receptacle and out through the conduit and the combined capacity of the apertures is greater than the capacity of the outlet conduit.

Conveniently positioned in the receptacle at about or slightly above the level of the apertures 8 and 9 is a longitudinal conduit 12 having a series of comparatively fine apertures 13 in the upper surface thereof. This conduit is connected at one end by means of a tube 14 with a pump 15 which receives its supply from the bottom of the receptacle by means of a conduit 16. Operation of the pump therefore draws heated fluid from the bottom of the receptacle, at which point it is in close proximity to the heated tubes, and discharges it through the small apertures of the pipe 13. As before stated, these apertures are in the upper side of the pipe and a multiplicity of the same are provided which are comparatively fine so that a great number of small streams of liquid are discharged upwardly in the receptacle as is indicated more clearly in Fig. 1. These streams, due to the pressure by the pump, rise to a certain height and as the force thereof is overcome by the force of gravity, the streams naturally break into drops and fall downward onto the surface of the liquid and is then reheated. The streams are not so small that a mist is produced in the upper part of the chamber and while I may hereafter use the term spray, it is to be understood that by such term is preferably meant drops of such size that there is no tendency of the same to float in the atmosphere of the receptacle as would be the case with a mist which some spray devices produce. It is further to be understood that a spray device may be utilized which is productive of a mist and means employed, as for instance baffles, preventing discharge of the mist through the outlet conduit 10, but by care being exercised to produce a stream of sufficient size that no great quantity of mist is produced, such construction as above mentioned is unnecessary. The theory of operation of this device is to cause the fluid to be broken up into a great quantity of small particles to increase the surface thereof exposed to atmosphere and to draw atmosphere at normal temperature or at a temperature below the temperature of the fluid through the sprayed or broken up fluid and to discharge the moisture laden air from the receptacle allowing the sprayed liquid to fall back into the main body thereof for reheating as is indicated and to continue this operation of alternately heating, spraying and chilling until the desired amount of moisture has been removed from the fluid. The principal feature of the invention is in the spraying of the fluid while at a temperature below that productive of detrimental effect and drawing a current of cooler air therethrough tending to chill the drops. This subjection of the heated drops to a current of cooler air causes the drops to give up the heat and in so doing the moisture is extracted and carried off with the current of air.

In order that the current of air may not be a rapidly moving current the apertures provided should be of large capacity and the discharge conduit of less capacity than the combined capacity of the apertures. In this manner the movement of the air may be sufficiently slow to prevent discharge of comminuted fluid therewith.

The operation of the device may be continuous if desired by continually discharging liquid into the tank and drawing it therefrom to maintain a normal level of liquid. Also the method may be employed on a specific quantity of liquid and the discharge of heated liquid in a spray form and passing of cooled air therethrough is continued until the desired degree of concentration attained.

I have above described the method as utilizing atmospheric air of normal temperature. It is to be understood, however, that the air may be dried and also may be cooled previous to its entering the receptacle. By previously drying the air, its capacity for taking up moisture is increased and the volume necessary for the purpose herein described may be reduced.

By the method described the cost of operation is naturally reduced and fluid may be rapidly condensed to the desired degree without natural chemical or physical change. After condensing, the liquid may be drawn off in any approved manner to be finally cooled, or arrangement may be made to pass cooling water through the stream coils.

Having thus briefly described my improved method, what I claim is—

1. A method of condensing milk or other fluids containing solids consisting in heating the fluid to a temperature not to exceed 160 degrees F. in a chamber or receptacle, spraying the heated fluid into the upper part of the receptacle above the liquid level to fall back into the body of the heated fluid, and passing air through the sprayed fluid over the surface of the heated body of fluid.

2. The method of condensing milk or other fluids consisting in heating the fluid in a chamber to a temperature below that at which detrimental chemical or physical change may take place, continuously forcing a portion of the fluid through spray devices to spray the same upwardly in the said chamber to fall downward into the body of heated fluid, and passing air through the sprayed fluid and over the surface of the heated body of fluid of a temperature below that of the temperature of the fluid.

3. The method of condensing fluids consisting in heating the same in a chamber, continuously discharging a portion of the fluid in streams upwardly in the chamber to fall by gravity into the body of the heated fluid, and passing air across the surface of the heated liquid body and through the falling fluid of a temperature to chill the sprayed fluid.

4. The method of condensing milk consisting in heating a body of the fluid to a temperature not to exceed 160 degrees F. in a chamber, pumping the fluid from the bottom of the said chamber and spraying it upward therein to fall by gravity into the body of fluid, and passing air therethrough and over the surface of the heated liquid body of a temperature below the temperature of the liquid and having an avidity for moisture, the air tending to chill the sprayed liquid which is reheated as it falls into the body thereof and is again sprayed and exposed to the moisture absorbing air, the process continuing until the entire body of the liquid is condensed to the desired extent.

5. In a method of concentrating milk and other fluids containing solids, the steps consisting in heating the fluid in a chamber and causing a portion of the fluid to be sprayed thereabove to fall back into the body of the fluid and passing a current of air over the surface of the heated body through the spray to remove moisture therefrom.

6. In a method of concentrating milk and other fluids containing solids, the steps consisting in heating the fluid in a chamber and causing a portion of the fluid to be sprayed thereabove to fall back into the body of the fluid, and passing current of dry air having a temperature below that of the fluid over the surface of the heated body and through the spray to cause separation of the moisture and solids of fluid, and removal of moisture from the chamber.

In testimony whereof, I sign this specification.

CHARLES E. ROGERS.